United States Patent [19]

DeVault et al.

[11] Patent Number: 4,934,149

[45] Date of Patent: Jun. 19, 1990

[54] METHOD OF REDUCING CHLOROFLUOROCARBON REFRIGERANT EMISSONS TO THE ATMOSPHERE

[75] Inventors: Robert C. DeVault, Knoxville; Phillip D. Fairchild, Clinton, both of Tenn.; Wendell J. Biermann, Fayetteville, N.Y.

[73] Assignee: The United States of America as represented by the United States Department of Energy, Washington, D.C.

[21] Appl. No.: 294,015

[22] Filed: Jan. 6, 1989

[51] Int. Cl.$^5$ ............................................. F17C 11/00
[52] U.S. Cl. ........................................ 62/46.3; 62/292
[58] Field of Search ....................... 62/46.1, 46.3, 292

[56] References Cited

U.S. PATENT DOCUMENTS

| | | | |
|---|---|---|---|
| 3,950,960 | 4/1976 | Kawam | 62/46.3 |
| 3,967,465 | 7/1976 | Asselman et al. | 62/46.3 |
| 3,972,201 | 8/1976 | Datis | 62/46.1 |
| 4,017,252 | 4/1977 | Tallonneau | 62/46.3 |
| 4,259,846 | 4/1981 | Rudolphi et al. | 62/46.3 |
| 4,363,222 | 12/1982 | Cain | 62/292 |
| 4,580,404 | 4/1986 | Pez et al. | 62/46.3 |
| 4,761,961 | 8/1988 | Marx | 62/292 |
| 4,768,347 | 9/1988 | Manz et al. | 62/292 |
| 4,776,174 | 10/1988 | Rich et al. | 62/292 |

Primary Examiner—Ronald C. Capossela
Attorney, Agent, or Firm—Stephen D. Hamel; William R. Moser; Richard E. Constant

[57] ABSTRACT

A method is disclosed for reducing chloroflurocarbon (CFC) refrigerant emissions during removal or transfer or refrigerants from a vapor compression cooling system or heat pump which comprises contacting the refrigerant with a suitable sorbent material. The sorbent material allows for the storage and retention or the chlorofluorocarbon in non-gaseous form so that it does not tend to escape to the atmosphere where it would cause harm by contributing to ozone depletion. In other aspects of the invention, contacting of CFC refrigerants with sorbent material allows for purification and recycling of used refrigerant, and a device containing stored sorbent material can be employed in the detection of refrigerant leakage in a cooling system or heat pump.

5 Claims, 1 Drawing Sheet

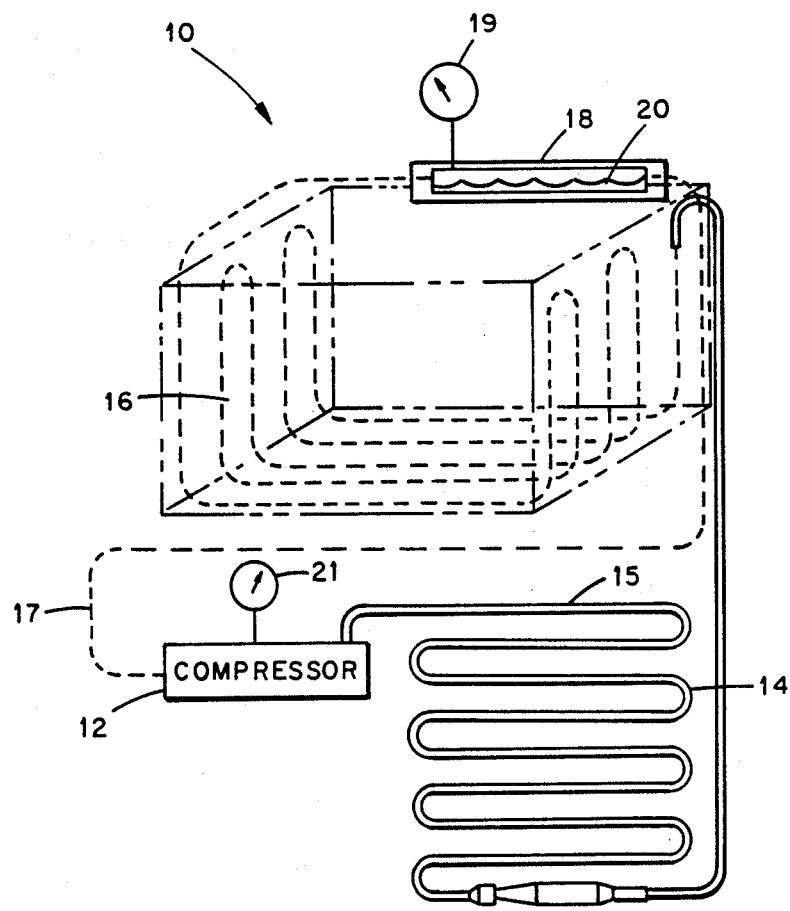

METHOD OF REDUCING CHLOROFLUOROCARBON REFRIGERANT EMISSONS TO THE ATMOSPHERE

The Government has rights in this invention pursuant to Contract No. DE-AC05-84OR21400 awarded by the U.S. Department of Energy.

BACKGROUND OF THE INVENTION

The invention relates in general to the reduction of chlorofluorocarbon (CFC) emissions in CFC refrigerants, and in particular to a method of reducing CFC emissions and increasing CFC reusability by contacting the CFC with a sorbent material.

At present, chlorofluorocarbons (CFC's) are used extensively in a wide variety of applications. Of the many known CFC's, the chlorofluoromethanes, particularly $CFCl_3$ (CFC-11), $CF_2Cl_2$ (CFC-12) and $CHClF_2$ (CFC-22) are extremely valuable for refrigeration and air conditioning, and are very useful as industrial solvents and as foaming agents i the manufacture of plastic foams. They are also widely used as aerosol propellants. Unfortunately, these compounds sooner or later find their way into the atmosphere, and it is currently thought that the CFC's are causing a substantial reduction in the concentration of stratospheric ozone. A recent study (as reported in the Washington Post, Mar. 16, 1988) reported CFC-related ozone depletion ranging from 3 percent over North Americal and Europe to greater than 6 percent above Alaska and Scandinavia. This ozone depletion may cause increases in cases of skin cancer, eye cataracts and other maladies which affect plant and animal life since it is the ozone that normally blocks a great proportion of the ultraviolet radiation which reaches the Earth. When the ozone layer decreases, the amount of ultraviolet radiation passing through the atmosphere increases, and there is a resultant increase in harmful UV radiation at the Earth's surface.

Another problem that CFC's have been linked with is what is known as the "greenhouse effect". This effect relates to an atmospheric phenomena by which there is an increase in conversion of solar radiation into heat and a decrease in overall radiant cooling on the Earth. As a result, a warming of the Earth's surface and substantial unpredictable changes in its climate could take place. Because of these and other environmental problems, the U.S. Government has proposed short term freezes on manufactured chemicals that deplete the ozone layer, particularly CFC's, with a long term goal of gradually eliminating most or all of the emissions associated with ozone depleting CFC's.

The heart of the problem with CFC refrigerant emissions relates to the particular physical properties of these compounds. Most CFC refrigerants have very low boiling points and will boil at normal atmospheric temperatures and pressures. As a result, the refrigerants are easily lost to the atmosphere when allowed to escape during transfer or from leakage during normal use. As is most often the case, a good part of the refrigerant will be able to escape during normal servicing of a cooling system or heat pump. When CFC's are removed from a system during maintenance, the removal of refrigerant is not usually conducted under conditions which minimize the loss of the refrigerant to the atmosphere. Thus, CFC's escape to the atmosphere during servicing.

The other major source of CFC emissions is leakage from the various vapor compression coolant systems during operation. At present, there are few techniques available which can conveniently and inexpensively monitor and control such leaks, and small leaks can go undetected for long periods of time (at least until the coolant system performance is substantially affected). This can lead to a large amount of refrigerant charge escaping into the atmosphere from a particular impaired coolant system. It is thus desirable to develop cheap and effective methods to control CFC refrigerant emissions to the atmosphere which occur by leakage or through removal of refrigerant.

Another problem regarding CFC refrigerants is that they are not purified by conventional recovery techniques, a problem which restricts reuse potential. Often, even in cases where the CFC can be recovered from a coolant system with minimal escape of emissions, reuse of that refrigerant after a compressor "burnout" is undesirable because the refrigerant is "dirty" with harmful contaminants. This "dirty" condition of the CFC refrigerant is caused by the accumulation of various contaminants from vapor compression systems including non-condensible gases, oil, acid gases, and possibly water along with other contaminants from failed compressors, motor parts, etc. It is generally not economically feasible to clean the "dirty" CFC refrigerant for reuse by use of currently available techniques. It would be highly desirable, therefore, to be able to cheaply and conveniently be able to recover, clean and purify used CFC refrigerants in order to put them in a state where they can be reused.

SUMMARY OF THE INVENTION

It is thus an object of the present invention to provide a method by which one can inexpensively and effectively reduce and control the amount of CFC refrigerant which escapes to the atmosphere during transfer of the refrigerant or by leakage.

It is also an object of the invention to provide a means whereby transfer of CFC refrigerants can be conducted with minimal escape of the CFC to the atmosphere.

It is further an object of the invention to be able to detect and control refrigerant leakage.

It is still further an object of the invention to provide a method of cheaply purifying used CFC refrigerant so that it can be recycled and reused effectively.

These and other objects are provided by contacting CFC refrigerants with a sorbent material which stores and retains the refrigerant in liquid form so that the CFC does not readily escape to the atmosphere. By use of a suitable sorbent material, CFC refrigerants can be stored and retained during transfer for service or testing, and the transfer of the refrigerant can be conducted without appreciable escape of CFC emissions to the atmosphere.

In another aspect of the invention, a method of purifying CFC emissions is provided by contacting used or "dirty" CFC refrigerant with a suitable sorbent material, followed by evaporating out the refrigerant from the contaminated refrigerant-sorbent mixture, thereby recovering the refrigerant in a "purified" form suitable for reuse.

In still another aspect of the invention a method for detecting refrigerant leaks from vapor compression systems is provided which comprises placing an absorption storage device in the refrigerant system, said device being temperature responsive to the amount of refrigerant in the system, and monitoring the temperature of the device in order to detect when the amount of refrigerant in the system has decreased.

BRIEF DESCRIPTION OF THE DRAWING FIGURE

The drawing FIGURE is a schematic view of an apparatus for detecting refrigerant leaks in accordance with an embodiment of the present invention.

DETAILED DESCRIPTION OF THE PREFERRED EMBODIMENT

In accordance with the present invention, a method is provided by which a chlorofluorocarbon refrigerant is contacted with a sorbent material in order to reduce the tendency of the refrigerant to escape to the atmosphere and allow the CFC compounds to be stored safely even when conditions approach atmospheric pressure and room temperature. Normally, there is a great tendency for CFC compounds to vaporize under standard temperature and pressure conditions. For example, the boiling point of chlorodifluoromethane at 1 atm. pressure is about −40.75° C. Thus, under normal conditions, a great deal of the CFC refrigerant will escape when the refrigerant has to be removed from vapor compression systems for normal servicing of the machinery, transfer of the coolant, or for other reasons. By contacting the CFC refrigerant with a sorbent material capable of absorbing the refrigerant in some manner (e.g., absorption, chemisorption), the escape of CFC emissions to the atmosphere can be substantially reduced. Through the use of a suitable sorbent material in which a CFC refrigerant can be dissolved and retained, the refrigerant can be stored more safely and effectively using conventional containing means.

Chlorodifluoromethane, a CFC refrigerant also known as CFC-22 or Freon-22, is extremely amenable to absorption techniques since it undergoes high levels of hydrogen bonding. Hydrogen bonding CFC's, such as CFC-22, readily interact with and are retained by suitable sorbents, such as N-methyl-2-pyrrolidone (NMP). In experimental tests, up to about 50% (w/w) of CFC-22 was able to be dissolved in NMP solution at 0° C., and up to about 35% of the CFC-22 was still retained in the NMP solution at room temperature (both tests carried out at 1 atm.).

The method of the present invention can also be carried out with non-hydrogen bonding CFC's such as trichloromfluoromethane ($CCl_3F$ or CFC-11), dichlorodifluoromethane ($CCl_2F_2$ or CFC-12), and dichlorotetrafluoromethane ($C_2Cl_2F_4$ or CFC-114) which are not as readily absorbed as CFC's such as CFC-22. In these cases, it is sometimes necessary to use a stronger sorbent material, or to contact the sorbent with the refrigerant using a cooled storage container. One such sorbent material particularly useful with non-hydrogen bonding CFC's is a tetrachloroethane such as 1,1,2,2-tetrachloroethane.

There are many absorbent materials which can be used to reduce CFC emissions in accordance with the present invention. However, it has been observed that there are a number of readily available, inexpensive solvents and sorbents that can be successfully with the CFC compounds, and it is preferred that these sorbents be used in the invention. In addition to NMP and tetrachloroethane discussed above, suitable sorbent materials include ethyl tetrahydro furfuryl ether (ETFE), tetraethylene glycol dimethyl ether (TEGDME), triethylene glycol dimethylether ($T_rEGDME$), N,N-dimethyl formamide (DMF), and the general class of chemicals known as dimethylamides. A number of these compounds are presently used as inexpensive industrial solvents, and as such are easily obtainable for the purposes of the present invention. Use of these sorbent materials will ensure that the method of the invention can be carried out conveniently and inexpensively as well.

It is contemplated that the method of the present invention will be most effectively carried out through the use of an absorption storage bottle which can be used in the removal of the CFC refrigerant from vapor compression machinery. When it is desired to remove the collant, a sealable absorption storage bottle containing a suitable sorbent material (preferably ⅓ to ⅔ full with sorbent) is placed or connected in a convenient manner to a refrigerant exit valve (or other conventional emptying valve) in the machinery from which the refrigerant is normally removed. By connecting the storage bottle to such an exit valve, the CFC refrigerant can be contacted directly with the sorbent material so as to be quickly absorbed rather than escape into the atmosphere. When such a transfer of refrigerant takes place, the use of a sorbent material reduces the level of CFC escaping to the atmosphere both at the time of the removal, and during the time that the refrigerant needs to be stored before it is either purified or put to its next use.

The use of an absorption storage bottle containing a suitable storage material is generally sufficient to ensure absorption of the CFC refrigerant in such a manner as to greatly reduce the chances that refrigerant emissions will escape to the atmosphere. However, in some cases, particularly where a non-hydrogen bonding CFC refrigerant is being removed from a system, it may be necessary to use a container which is itself cooled in some manner, or which may readily be cooled by external means. For isntance, a storage bottle cooled by dry ice may be used to retain the refrigerant-sorbent mixture. The temperature at which the container will have to be stored will vary depending on the particular refrigerant and sorbent used, but generally will not be below around −10° C.

In another aspect of the present invention, it has been discovered that it is possible to purify used CFC refrigerants (i.e., remove contaminants) by contacting them with a suitable sorbent material, then separating out the contaminants in any of a number of conventional separation techniques. It has been observed that contacting CFC's with sorbents automatically "cleans" the CFC refrigerant because of the strong bonding between the refrigerant and the sorbent. When a refrigerant is contacted with the sorbent material, noncondensible gases and other contaminants are not equally soluble in the absorbent. This makes it possible to remove impurities from the refrigerant with conventional separation techniques. As an example, used refrigerant removed from a coolant system and contacted with a sorbent material can usually be purified by simple distillation. Sorbent material, containing dissolved refrigerant, is heated until boiling occurs and heating is continued until the refrigerant is entirely evaporated and recondensed. Noncondensibles will thus be removed. Less volatile contaminants, such as oil or acid salts, will stay in solution or form a separate solid phase after the refrigerant has been distilled (evaporated) out. The vaporized and recollected refrigerant will then be contaminant-free.

In the past, the major obstacle to the successful recovery and reuse of CFC refrigerants has been that the used refrigerants are "dirty", i.e., they contain various contaminants. Used or "dirty" CFC's will generally contain such impurities as oil, noncondensible gases, acid gases, or other contaminants from failed compressors, motor parts, and the like. In particular, in air conditioners or heat pumps in which a compressor motor has "burned out", there are a variety of acid gases, e.g., HF, HCl, etc. which must be removed from the sytsem to avoid further reliability problems. With acid gases and other impurities retained by the refrigerant, reuse is precluded. By contacting the CFC refrigerant with a suitable sorbent in accordance with the present invention, impurities and contaminants such as acid gases can be removed conveniently and effectively. As a result, successful recovery and reuse of CFC refrigerants can now be accomplished simply and inexpensively.

Another problem in the reuse of refrigerant which is overcome by the present invention is the incompatibility of refrigerant oils for machinery from some of the different manufacturers in this field. At present, several different refrigerant oils are used by the different heat pump producers, and recovered refrigerant from one system may not be suitable for use in a system from a different manufacturer. This problem has resulted from the particular refrigerant oil used in one company's coolant system which normally stays in the CFC refrigerant as an impurity. By contacting the CFC refrigerant with a sorbent material in accordance with the present invention, such refrigerant oil impurities are easily removed from the CFC refrigerant. Again, the oil impurity can be separated out from the coolant/sorbent mixture by conventional techniques such as distillation or evaporation, and the CFC refrigerant when recovered will be virtually oil-free. As a result of the technique of the present invention, it will be possible to recover a refrigerant from a particular manufacturer's coolant system, and recycle it into a system of a different manufacturer.

In still another aspect of the present invention, a method of detecting low refrigerant charge in a vapor compression cooling system (e.g., when the machine is leaking CFC's) is provided through the placement of a sorbent material-containing storage device into the coolant system, and monitoring the temperature in the storage device. By monitoring the temperature in the storage device, or by comparing the temperature in the storage device with the temperature at another part of the coolant system (e.g., at the compressor), one will be able to determine if the proper amount of refrigerant charge has remained in the system. In a case where the coolant system is leaking CFC's, the lower amount of refrigerant charge in the system will cause a higher absorbent temperature needed to maintain the same amount of compressor superheat in the machine. Thus, when temperature readings of the absorbent-containing storage device are abnormally high, or are gradually increasing for a particular compressor superheat, this will be indicative of leaks in the cooling system which need to be repaired.

An embodiment of an apparatus for carrying out this aspect of the invention is depicted schematically in the drawing figure. In this figure, a schematic vapor compression coolant system 10 is shown consisting primarily of a compressor 12, condenser 14, and evaporator 16, and having a high pressure side 15 and low pressure side 17, indicated by broken lines. In this embodiment, an absorbent-containing storage device 18 is connected to the system so that a CFC refrigerant can flow through it. The absorbent 20 stored in the device 18 is preferably kept at a level away from the refrigerant so that the refrigerant flows through the device without contacting the absorbent. The storage device 18 also includes a temperature monitoring device 19 which is preferably set at a desired reading in order to transmit a signal when temperatures are higher than expected. It is also possible to monitor temperature by placing a second temperature monitoring device 21 at the compressor, so that temperatures at the storage device 18 and the compressor 12 can be constantly monitored and compared. When a high temperature is read at the absorbent device 18, as compared to the reading of superheat at the compressor 12, this will be indicative of low refrigerant charge in the coolant system, and the system can then be checked for leaks. By employing an apparatus having an absorbent-containing storage device as provided in the present invention, leakage of CFC refrigerants to the atmosphere can be detected and stopped at any early stage, thus again reducing CFC emissions to the atmosphere.

The following example is presented as illustrative of the present invention and should not be construed as limiting it in any way:

EXAMPLE

A refrigeration test system containing approximately 0.14 pounds of the refrigerant chlorodifluoromethane (CFC-22 or $CHClF_2$) had its coolant drained into an absorption storage bottle containing approximately 0.52 pounds of N-methyl-2-pyrrolidone (NMP) at several different temperatures. The normal boiling point for refrigerant CFC-22 is $-40.75°$ C., and if collected at 1 atm. pressure, will normally vaporize into the atmosphere at temperatures above this boiling point. It was observed, however, that when contacted with the absorbent NMP, a large proportion of the CFC-22 coolant dissolved in the NMP and thus could be stored as a liquid under atmospheric pressure. Table I shows the results carried out at room temperature. The results of the dissolution tests at different temperatures are observed in Table II. The tests show that the fraction of CFC-22 which remained dissolved in NMP solution was as high as 50% at a temperature of 0° C., and that approximately 28% of the CFC-22 remained in solution at temperatures as high as 30° C. The results of these tests indicated that a large amount of CFC refrigerant can be stored in liquid NMP absorbent, and that the amount dissolved under one atmosphere pressure is a function of temperature.

TABLE I

| Time | Weight of Container + NMP Solution + CFC-22 | Amount of CFC 22 Dissolved in NMP |
| --- | --- | --- |
| 0 | 0.52 lbs. | 0 |
| 5 min. | Not Measured | — |
| 10 min. | 0.60 | 0.08 |
| 15 min. | 0.62 | 0.10 |
| 20 min. | 0.66 | 0.14 |

Test started at room temperature (at about 72° F.), in container of NMP open to atmosphere.

TABLE II

| Temp. | Weight % CFC-22 dissolved in NMP Solution at 1 atm. pressure |
| --- | --- |
| 0° C. | 50% CFC-22 in solution |

TABLE II-continued

| Temp. | Weight % CFC-22 dissolved in NMP Solution at 1 atm. pressure |
| --- | --- |
| 10° C. | 41% CFC-22 in solution |
| 20° C. | 34% CFC-22 in solution |
| 30° C. | 28% CFC-22 in solution |

What is claimed is:

1. A method of reducing escape of chlorofluorocarbon refrigerant emissions to the atmosphere during removal of a chlorofluorocarbon refrigerant from a vapor compression cooling system or heat pump comprising contacting the chlorofluorocarbon refrigerant during removal with a sorbent material into which the chlorofluorocarbon refrigerant can be dissolved, said sorbent material being selected from the group consisting of N-methyl-2-pyrrolidone, ethyl tetrahydro furfuryl ether, tetramethylene glycol dimethylether, triethylene glycol dimethylether, N,N-diemethyl formamide, dimethylamides, and tetrachloroethane.

2. A method according to claim 1 wherein the sorbent material comprises 1,1,2,2-tetrachloroethane.

3. A method of detecting a condition of low refrigerant charge in a vapor compression cooling system or heat pump comprising placing a sorbent material-containing storage device into the cooling system or heat pump so that the refrigerant of the system or pump will flow through the storage device, and monitoring the temperature of the storage device in order to determine if a condition of low refrigerant charge exists.

4. A method according to claim 3 wherein the temperature is monitored at a second point in the cooling system or heat pump, and a condition of lower refrigerant charge is determined by a comparison of the temperature at the storage device with the temperature at the second point monitored.

5. A method according to claim 4 wherein temperature is monitored at the storage device and at the compressor of a cooling system or heat pump, and a condition of lower refrigerant charge is determined by comparing the temperature at the storage device with the temperature at the compressor.

* * * * *